United States Patent [19]

Franklin et al.

[11] Patent Number: 4,609,778
[45] Date of Patent: Sep. 2, 1986

[54] TRUNK CALL PROCESSING SERVICES FOR HOST COMPUTER INTERCONNECTIONS

[76] Inventors: Andrew D. Franklin, 3460 16th St., Boulder, Colo. 80302; John R. Lothrop, 3813 Columbia Dr., Longmont, Colo. 80501; John D. Wiidakas, 11471 N. Elm Way, Thornton, Colo. 80233

[21] Appl. No.: 654,886

[22] Filed: Sep. 27, 1984

[51] Int. Cl.[4] .......................................... H04M 11/00
[52] U.S. Cl. ............................. 179/2 DP; 179/7 R; 179/18 B; 179/18 D
[58] Field of Search ............... 179/2 DP, 7 R, 7.1 R, 179/7.1 TP, 18 B, 18 D

[56] References Cited

U.S. PATENT DOCUMENTS 4,310,727  1/1982  Lawser ............................ 179/18 B
4,535,199  8/1985  Zink ............................... 179/2 DP

FOREIGN PATENT DOCUMENTS 117181  8/1984  European Pat. Off. ......... 179/2 DP

OTHER PUBLICATIONS

"Frame-Mode Customer Access to Local Integrated Voice and Data Digital Networks", *IEEE 1979 International Conference on Communications*, N. Accarino et al., Jul. 1979, pp. 38.5/1-7.

Primary Examiner—Keith E. George

[57] ABSTRACT

In a communication switching system controlled by a control processor, line port circuit connections are served by line call processing algorithms and trunk port circuit connections are served by trunk call processing algorithms. Trunk call processing algorithms offer the user a wide variety of call processing features and system management capabilities which are not included in normal line call processing algorithms. Host computer interconnections are typically established between digital line port circuits and therefore, host interconnections are administered by line call processing algorithms which offer only a limited set of services. To provide trunk services for host computer interconnections, an auxiliary algorithm has been added to the normal line call processing algorithms to interlink line to trunk call processing. In particular, when a host computer is served, the normal line call processing algorithm branches to the auxiliary algorithm. The auxiliary algorithm simulates the signalling characteristics associated with a trunk port circuit during the call set-up phase of a connection. Following simulation, the auxiliary algorithm intercepts the normal trunk call processing algorithms. The control processor "perceives" the service request as originating from an analog trunk port circuit rather than a digital line port circuit, and therefore administers the request according to trunk call processing algorithms. Call processing features and system management capabilities associated with trunk services are now automatically available for the host computer interconnection.

8 Claims, 9 Drawing Figures

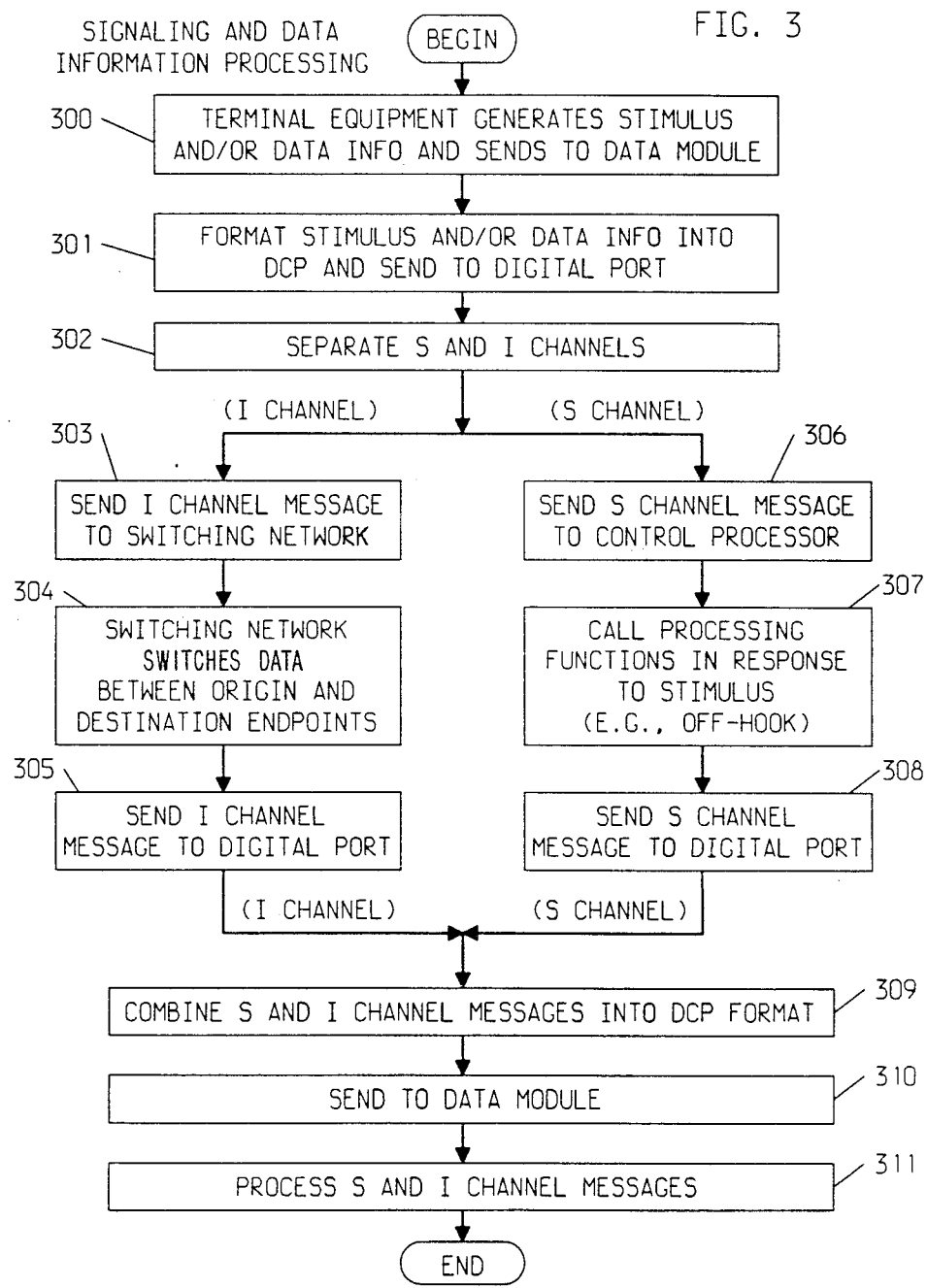

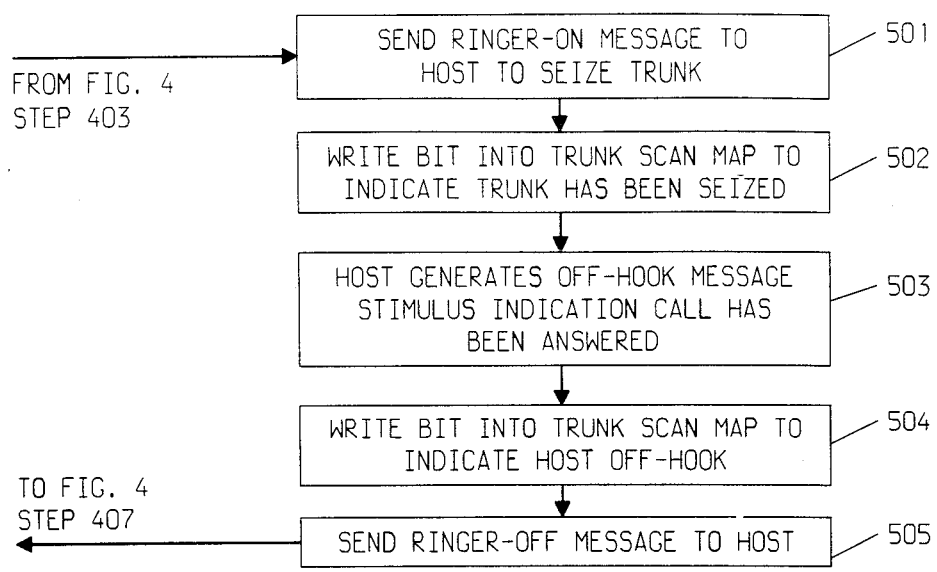
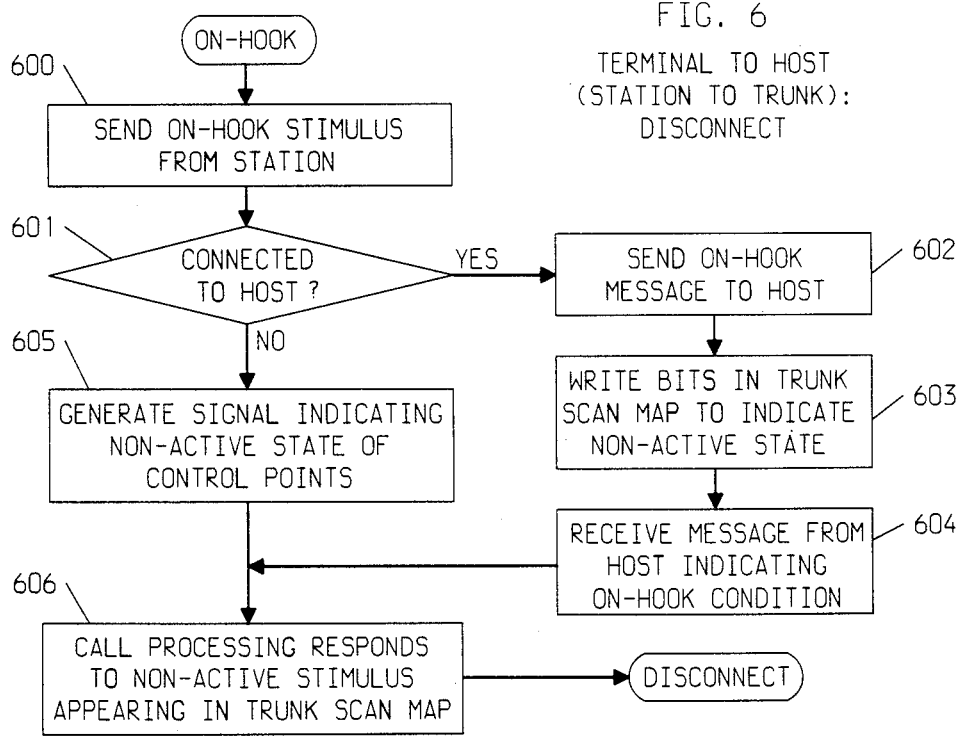

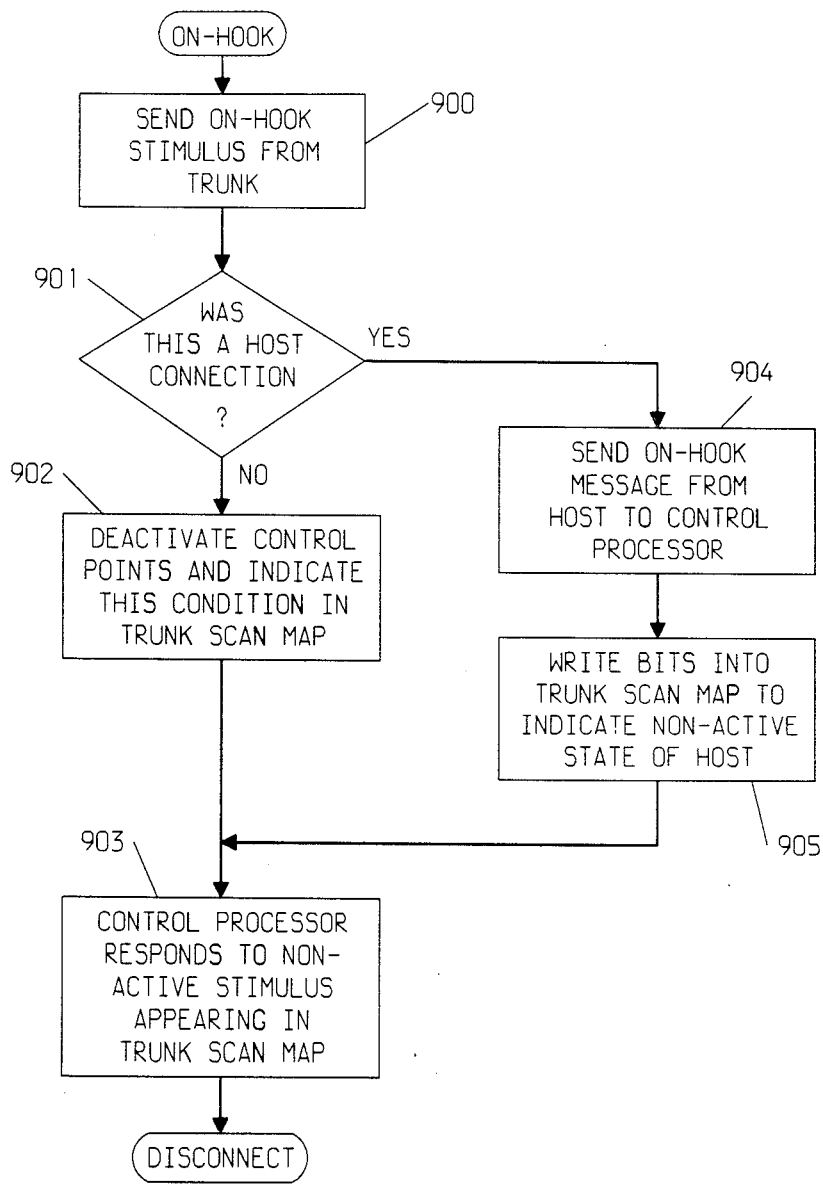

TRUNK CALL PROCESSING SERVICES FOR HOST COMPUTER INTERCONNECTIONS

TECHNICAL FIELD

This invention relates to a communication switching system and, in particular, to station interconnections between a terminal and a host computer wherein the switching system processes station call interconnection according to existing analog trunk call processing algorithms. Processing the connection in this manner allows a variety of call processing features and system management capabilities to be used with the established station call interconnections.

BACKGROUND OF THE INVENTION

Typical communication systems interconnect a variety of communication devices and offer a wide range of services. These services may include both call processing features such as on-hook and off-hook queuing and system management capabilities such as station message detail recording SMDR.

The queuing feature provides a calling party with efficient call processing. For example, when a trunk is not immediately available to a calling party following dialing, the calling party need not redial since the system will automatically queue the trunk request and complete the call connection when a trunk becomes available. SMDR is an administrative function which provides the customer with an accurate billing record of information for each call connection. Such information includes an identification of the calling and called stations, an indication as to the time of call placement and the duration of the call. Services of the type described are currently only available for those connections processed according to trunk call processing algorithms.

In the communication switching system, each analog facility is served by either a line port circuit or trunk port circuit. These ports include circuit boards having physical control points. The control points generate signals indicative of a present state i.e., on-hook or off-hook, of each associated analog device. A control processor in the switching system indirectly scans the ports and determines the state of the physical control points on the board in order to affect connect and disconnect call processing operations. The control processor responds to the generated signals and implements the appropriate call processing algorithms in response to port circuit type i.e., line or trunk.

Line call processing which serves line port circuit connections offer a user basic connect and disconnect services with only a limited number of system management capabilities. In contrast, trunk call processing which serves trunk port circuit connections offer the user an extensive number of services including those previously described. The control processor processes each connection according to the type of port and therefore, can only implement call processing features and system management capabilities when analog trunk ports are served.

In addition to serving analog facilities, the communication switching system also serves digital facilities such as terminals and host computers. Host computers typically serve a plurality of terminal users and require a large number of host computer access ports. Digital line port circuits are used to provide host computer access. Trunk port circuits are not used since trunk ports are more expensive, consume more physical space and severely limit the number of customers served by a single communication switching system arrangement. Therefore, all terminals and host computers are connected to the switching system via digital line ports, and connections between these digital facilities are processed according to line call processing algorithms.

As previously discussed, line call processing offers the user a limited set of services. Therefore it would be advantageous to provide, in an economic and efficient manner, call processing features and system management capabilities such as those available for trunk call processing for the digital line port circuit connections which serve terminal/host computer interconnections.

SUMMARY OF THE INVENTION

The subject invention provides call processing features and system management capabilities for digital line port circuit connections, such as between a terminal and a host computer, without requiring extensive system modification or incurring large software development expenses. In particular, the control processor responds to port type, i.e., line or trunk, and initiates either line or trunk call processing accordingly. In an existing communication switching system, an auxiliary algorithm has been added to line port call processing. The normal line port call processing algorithm branches to the auxiliary algorithm when a host computer is served. This auxiliary algorithm utilizes information contained in data messages received from digital line port circuits to simulate signalling characteristics associated with an analog trunk port circuit. In this manner, the control processor "perceives" the service request as originating from a trunk port circuit when, in fact, such a service request originated from a digital line port circuit. Following simulation, the normal trunk call processing algorithm processes the terminal/host computer connection as a trunk connection. Services of the type previously described are now automatically available for terminal/host computer interconnections. The auxiliary algorithm serves to interlink existing line and trunk call processing during the call set-up and take-down phase of the connection.

In the typical communication system the digital facilities are connected by a communication path extending through the control processor. The communication path conveys call-related information between the control processor and the digital facilities. The digital facilities include digital stations connected by a path to data modules which serve as interfaces between the digital stations and digital line port circuits. The digital line port circuits connect indirectly to the control processor. To establish, for example, a connection from a terminal to a host computer, a terminal user generates a stimulus indicating an off-hook condition. However, because the station is of the digital type, the off-hook stimulus is not represented as signals generated by control points on a port circuit board, but takes the form of digitally encoded data messages. The digital station generates signals via an associated data module which converts the user generated off-hook stimulus into a data message and transfers, indirectly the data message via the digital line port circuit over the communication path to the control processor. The control processor responds to the data message indicating the off-hook condition of the terminal and generates a reply data message prompting the terminal user to specify a destination. This portion of processing occurs via line call processing. Assume the terminal user requests access to a host computer as indicated by the next generated data message, and the control processor receives this message over the communication path.

In response to the data message requesting host computer access, the normal line call processing immediately branches to the auxiliary algorithm. A series of data messages are exchanged between the control processor and the terminal, and the control processor and the host computer to establish a connection. Assume, the host computer is accessible. The auxiliary algorithm then provides the control processor with a sequence of data messages that simulate the trunk signalling characteristics associated with a trunk port circuit during the call set-up phase of a connection. In particular, the control processor receives the generated data messages containing information indicating that the host computer port circuit is off-hook. These data messages emulate the signals generated by the physical control points located on a trunk port circuit board. The control processor responds to these "signals" and generates the appropriate response "signals" i.e., data messages, associated with trunk call set-up operations. For example, one operation seizes an available trunk by activating appropriate control points. In contrast, the host computer receives a data message which contains information indicating that the host computer is now seized. The control processor "perceives" the "signals" as being from an analog trunk port circuit and disregards the fact that the originating port circuit is a digital line port circuit. At the conclusion of the implementation of the auxiliary algorithm, the control processor now links into the trunk call processing algorithms and treats the terminal/host computer interconnection as a trunk connection. Thereafter, the control processor administers this interconnection according to trunk call processing algorithms. Processing the interconnection between the terminal and host computer in this manner provides the user with immediate availability of trunk services including call processing features and system management capabilities.

BRIEF DESCRIPTION OF THE DRAWINGS

The foregoing and other advantages of this invention will be apparent from the following detailed description of an exemplary embodiment thereof, when read in conjunction with the accompanying drawings, in which;

FIG. 2 illustrates the data message format of digital information;

FIG. 3 illustrates a flowchart representing the S channel and I channel data message transmissions with reference to the system shown in FIG. 1;

FIGS. 4, 5 and 6 illustrate flowcharts representing the logical steps necessary for processing connect and disconnect requests from a terminal to a host computer; and FIGS. 7, 8 and 9 illustrate flowcharts representing the logical steps necessary for processing connect and disconnect requests from a host computer to a terminal.

DETAILED DESCRIPTION

Figure 1:
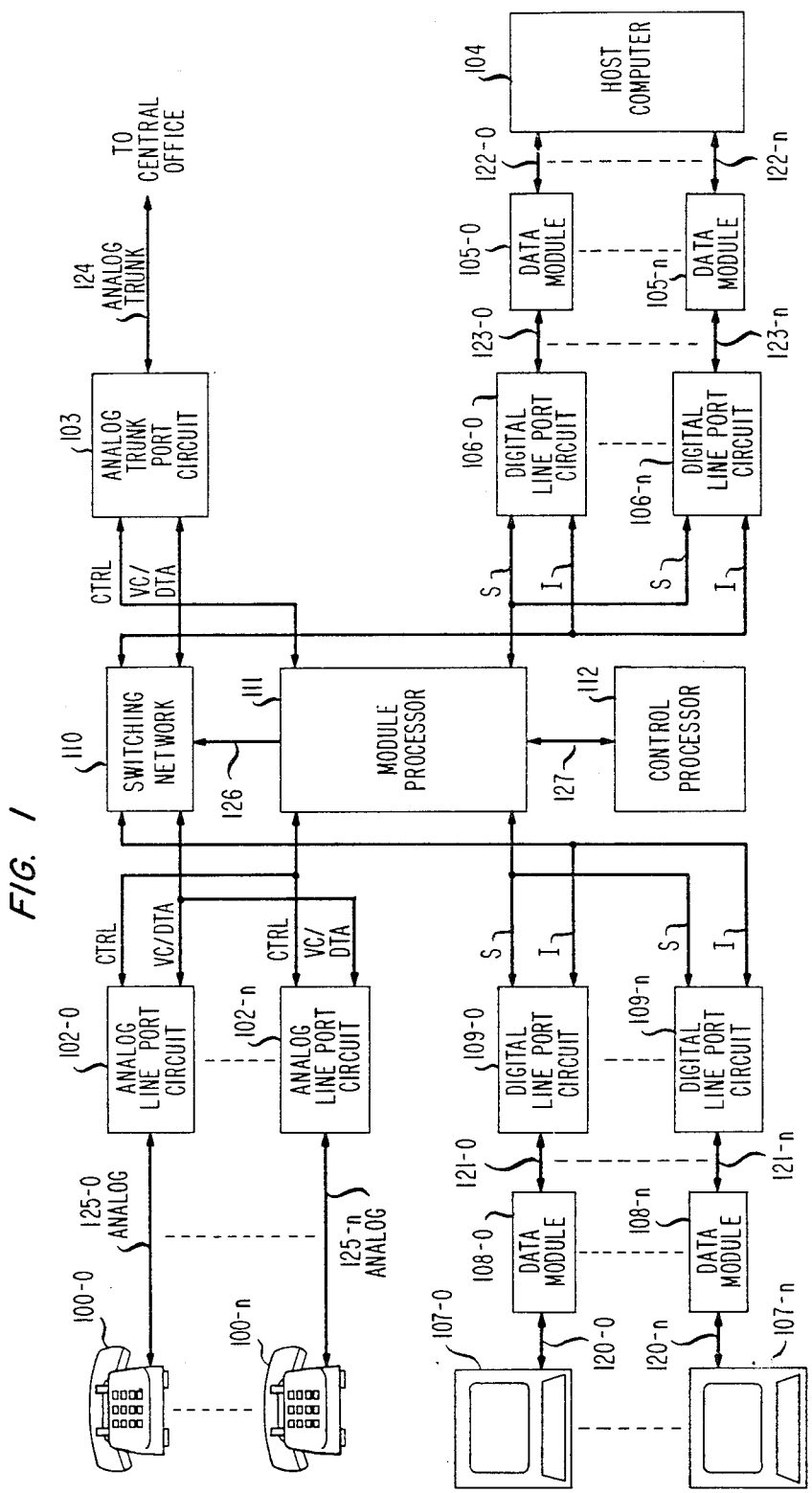
FIG. 1 illustrates a block diagram of a typical communication switching system.

FIG. 1 illustrates a block diagram of a communication switching system. This system comprises control processor 112, module processor 111 and switching network 110. Control processor 112 and module processor 111 together control the operation of switching network 110, which is advantageously of the digital type. These elements serve to interconnect a variety of communication equipment. The specifics of the provided equipment depend upon the type of equipment served.

ANALOG FACILITIES

Analog stations 100-0 through 100-n connect via lines 125-0 through 125-n to analog line port circuits 102-0 through 102-n. Analog trunk port circuit 103 connects to analog trunk 124. Analog trunk 124 connects to any type of analog trunk facility. FIG. 1 shows the trunk facility as a central office (C.O.). Analog line port circuits 102-0 through 102-n connect to a plurality of control and signalling conductors, i.e. control paths (CTRL) and voice/data paths (VC/DTA), which extend through module processor 111 and switching network 110 to analog trunk port circuit 103. Control processor 112 establishes interconnections between the analog facilities. Assume the initiation of the call set-up phase for an interconnection between an analog station set 100-0 user and the C.O.

The analog station set 100-0 user goes off-hook. The action of a station set user going on-hook or off-hook is termed an on-hook or off-hook stimulus. In response to the off-hook stimulus, station set 100-0 generates signals. These signals are applied over a communication pair of conductors shown as analog line 125-0. The signals on analog line 125-0 activate analog port 102-0 and, in particular, the signals activate circuit control points (not shown) on the line port circuit board of port 102-0. These activated control points indicate a change in condition or state of the associated station set 100-0. Assume for the remainder of this description, that analog station 100-0 user changed from an on-hook to an off-hook state, and that the off-hook control points are now "active".

Assume further that analog line port circuit 102-0 includes a single active control point to indicate the off-hook condition. As previously indicated, the analog station 100-0 user generates an off-hook stimulus and activates the single control point. This control point is hard-wired to the CRTL lead. When this control point is activated in response to an off-hook stimulus, a signal is applied to the CTRL lead.

Analog port 102-0 applies this signal indicative of the off-hook condition over the CTRL lead to module processor 111. Module processor 111 periodically scans all the port circuits and detects the appearance of signals on the CTRL lead. The VC/DTA path is not considered at this time since no signals are present during the call set-up phase of an interconnection. Module processor 111 detects the off-hook indication signal on the CTRL lead and extends this indication as a signal over path 127 to control processor 112.

CONTROL PROCESSOR 112

Control processor 112, which is advantageously of the stored program control type, maintains several call processing algorithms. One algorithm processes connections in response to signals received from line port circuits, and another algorithm processes connections in response to signals received from trunk port circuits. Control processor 112 determines the appropriate type of call processing, either line or trunk, in response to the type of port circuit, i.e., line or trunk, served. In particular, control processor 112 includes two areas of memory (not shown). Each memory contains locations which maintain a one to one correspondence to the physical control points located on a line or trunk port circuit board. These memories having the one to one correspondence are termed, respectively, a line scan map and a trunk scan map.

The scan maps reflect the active or non-active state of the control points associated with either a trunk port circuit or line port circuit. An active state indicates an off-hook condition and non-active state indicates an on-hook condition. For example, when the control point of a line port circuit is active, this indicates an off-hook condition of the associated subscriber station; and conversely, when the control point is not active, this indicates an on-hook condition of the associated subscriber station. The scan maps in the control processor store information as to the current status of each subscriber station. When the subscriber's status changes, control processor 112 revises the status indication appearing in the scan map. Control processor 112 updates the scan map in order to reflect the current on-hook or off-hook condition as indicated by non-active or active control points located on each port circuit board having an associated station set. The control points generate signals over the CTRL lead, and module processor 111 detects these signals and transmits these signals over lead 127 to control processor 112. Each scan map type identifies a type of appearance. Trunk appearances identify trunk states and line appearances identify line states as detected from each respective scan map type. Control processor 112 responds and processes information according to the type of appearance as indicated by the stimulus appearing in a particular type of scan map, i.e. line or trunk.

In the present example, the analog station set 100-0 user generates an off-hook stimulus. In response to this stimulus, control processor 112 updates the line scan map to indicate that the control point of analog line port circuit 102-0 has changed from a non-active to an active state. Control processor 112 executes a series of instructions in response to this stimulus appearing in the line scan map, and the analog station set 100-0 user receives a dial tone indication which prompts the user to identify a destination.

TRUNK CONNECTION

Assume the user generates a trunk identification code that identifies the destination as the C.O. facility connected to analog trunk 124. Trunk port circuits have two control points. One control point indicates the state of the C.O. and the second control point indicates the state of the trunk access, i.e., the trunk port to the C.O. These control points indicate the idle/busy and active/non-active status of the trunk facility. Assume, that the trunk facility is in an idle/non-active state. The trunk scan map indicates that both control points are presently non-active. Control processor 112 executes a series of instructions in response to the trunk appearance to seize the idle trunk and applies these instructions as a signal over path 127 to module processor 111. Module processor 111 responds to this signal and generates a signal over the CTRL lead to analog trunk port circuit 103. As previously explained, the CTRL lead is hardwired to the control points located on the port circuit board, and when this signal activates the control points on the trunk port circuit board, the trunk is "seized". This indicates that the trunk port is active i.e., off hook, and that the C.O. has answered.

The active control points on analog trunk port circuit 103 generates signals indicative of the off-hook condition over path CTRL to module processor 111. Module processor 111 extends this information representing the off-hook condition over path 127 to control processor 112. In response to this information, control processor 112 updates the trunk scan map to indicate the off-hook condition of analog trunk port circuit 103. Control processor 112, now, processes the connection in response to the trunk appearance indicated by the trunk scan map. A trunk appearance causes control processor 112 to implement trunk call processing algorithms. The algorithms associated with trunk call processing are discussed subsequently.

Following the interconnection between the analog endpoints, the "talk" or voice/data state begins. Both voice and data information as generated from either endpoint is applied via the appropriate port circuit to the VC/DTA path. The VC/DTA path extends to switching network 110. Switching network 110 serves to exchange information between the connected endpoints. However, no further explanation of this process follows, since only call set-up operations are relevant to understanding the background for interconnections between terminals and a host computer.

In summary, a call is processed by control processor 112 according to the stimulus indication appearing in either the line or trunk scan map. The active or non-active state of the physical control points on a trunk or line port circuit indicates the on-hook or off-hook condition of an associated station set. The scan maps are constantly updated to reflect the current condition of each associated station. Control processor 112 processes connections according to the appearances in a particular type of scan map. Trunk scan map appearances initiate trunk processing algorithms and line scan map appearances initiate line processing algorithms to establish interconnections between analog endpoints. Control processor 112 includes these two types of processing capabilities.

The above describes the establishment of a call connection between analog facilities in the communication switching system of FIG. 1. No further detail is provided since the establishment of call interconnections between analog endpoints is well known.

DIGITAL ENDPOINT COMMUNICATION

Another type of interconnection available in the communication switching system of FIG. 1 is a digital connection such as between terminals 107-0 through 107-n to host computer 104. The terminals 107-n and host computer 104 are served by digital line port circuits 106-0 through 106-n and 109-0 through 109-n. Communication channels interconnect the digital endpoints via switching network 110 and module processor 111. As previously discussed, both switching network 110 and module processor 111 are under control of control processor 112.

In particular, control processor 112 monitors ports 106-0 through 106-n and 109-0 through 109-n via module processor 111. When module processor 111 receives a stimulus indication over the communication channels from any of the digital endpoints, module processor 111 applies this stimulus indication over path 127 to control processor 112. Control processor 112 responds to this stimulus and processes the stimulus accordingly to establish an interconnection. The process of establishing call connections between digital endpoints connected to a communication switching system occurs in a different manner than previously described with respect to the analog connections.

The communicative interchange of data between digital endpoints uses a well known data transmission format, known as Digital Communication Protocol (DCP). This protocol is discussed in an article authored by N. Accarino et al entitled "Frame Mode Customer Access to Local Intergrated Voice and Data Digital Networks", published in the conference report of the IEEE 1979 international Conference on Communications. The DCP frame format is illustrated in FIG. 2 wherein each DCP frame comprises twenty bits of information which are subdivided into a three bit F (Framing) field, a one bit S (Signalling) field and two 8-bit I (Information) fields. The F field carries the framing information required to synchronize the receiving facilities with the transmitted data frames or messages. The S field transmits signalling messages via module processor 111 in each direction between control processor 112 and the digital endpoints. These messages, as subsequently described, specify various system operations that are initiated and controlled by control processor 112 for serving the connection. The S field type messages facilitate the set-up and take-down of connections between origination and destination endpoints. The two I fields independently transmit information comprising the subject matter of a data transmission between data endpoints. For example, if a data terminal has an associated digital phone, the data to and from the phone would transmit in the $I_1$ field and the data to and from the terminal would transmit in the $I_2$ field. The switching network 110 connects the I fields to the destination and origination endpoints. All information generated and transmitted between digital endpoints is in the format illustrated in FIG. 2.

S AND I CHANNEL COMMUNICATION

FIG. 3 illustrates a generic flowchart that explains the generation and transmission of the S and I field data messages as applied to the S and I channels, respectively, shown on FIG. 1. The entire process of establishing a connection via the S and I channels is described subsequently. For explanation purposes, however, assume that the terminal 107-0 user begins the process of call set-up.

To originate a call the terminal 107-0 user depresses, for example, a break key. See U.S. Pat. No. 4,535,198 issued to G. N. Squicciarini, Ser. No. 514,882, filed on Aug. 13, 1985 for details concerning the terminal dialing operation. This action indicates an off-hook condition. An indication of this condition is applied from terminal 107-0 over path 120-0 to data module 108-0. This is indicated by step 300 of FIG. 3.

Data module 108-0 serves as the interface between terminal 107-0 and the rest of the communication switching system of FIG. 1. The details of data module 108-0 are described in U.S. Pat. No. 4,532,377 issued to J. H. Zink on July 30, 1985. Briefly, however, data module 108-0 converts the stimulus indication received from terminal 107-0 into the appropriate DCP format shown in FIG. 2. Following the formatting of the off-hook stimulus into the DCP format, data module 108-0 sends the entire data message over path 121-0 to digital line port 109-0 as indicated by step 301. Digital line port 109-0 is described in further detail in U.S. Pat. No. 4,534,023 issued to S. R. Peck et al. on Aug. 6, 1985. Digital line port 109-0 separates the I field messages from the S field message, and sends each message over the appropriate channel, S and I, respectively. This is indicated by step 302.

During the call set-up phase, the I field contains no information. However, following the established connection, digital line port 109-0 applies the I field information over the I channel to switching network 110 as shown in step 303. Switching network 110 may advantageously be a time slot interchanger of the type described in U.S. Pat. No. 4,485,469 issued to R. K. Witmore on Nov. 27, 1984. A time slot interchanger functions to connect one port with another port during an assigned time slot. The switching network 110 performs a time slot interchange function which transfers the information received from a time slot of the first port to the time slot assigned to a second port as indicated by steps 304 and 305. When a destination port such as digital line port 106-0 is identified, the I field information is sent via the I channel to an associated digital port 106-0 time slot in switching network 110 and then transferred directly over the I channel to digital line port 106-0 as shown in step 305. Digital line port 106-0 recombines the S and I channels, and formats the received information into the DCP format shown in FIG. 2 (step 309). Digital line port 106-0 applies this information over path 123-0 to an associated data module 105-0, as indicated by step 310. This information is disassembled from the DCP format by data module 105-0 and applied to the destination, host computer 104, as shown in step 311. The manner in which the I field information is received by one port and transmitted to another port comprises no part of the present invention and is therefore not discussed in further detail except to the extent shown on the flowchart in FIG. 3.

As previously described, the terminal 107-0 user generated an off-hook stimulus. Module processor 111 detects the appearance of the S channel message indicating an off-hook condition and receives this message over the S channel. Module processor 111 monitors the S channel at a sufficiently fast rate so as to prevent any incoming messages from data module 108-0 from overflowing or becoming lost within line port 109-0. Module processor 111, following retrieval of the S field message, transfers this message to control processor 112 as indicated by step 306 of FIG. 3. In the present example, control processor 112 responds to this received stimulus, i.e. the off-hook indication, and generates an S channel message containing information which prompts the terminal 107-0 user to identify the destination. Assume the user identifies host computer 104 as the destination. This is indicated by step 307. Following the call processing function that identifies host computer 104 as the destination, control processor 112 sends an S channel message over path 127 to module processor 111. Module processor 111 receives the S channel message from control processor 112 and sends the S channel message via the S channel to digital line port 106-0. As shown in steps 309 and 310, previously described, digital line port 106-0 combines the S and I channels and sends the S channel message over path 123-0 to data module 105-0. Data module 105-0 disassembles the DCP format of the message (step 310) and sends the S channel message to host computer 104 where the host computer's response to the S channel message may be, for example, a reciprocal off-hook indication. A connection is not yet established until additional S channel messages are exchanged between the endpoints and control processor 112. The flowchart in FIG. 3 is merely illustrative of the process of exchanging control and data information between digital endpoints.

Digital interconnections are established by utilizing data messages containing information as to the subscriber's status. This differs from analog interconnections which utilize signals as generated from control points to indicate the subscriber's status. In particular, analog interconnections are established between line port circuits and/or trunk port circuits. Each port circuit comprises at least one control point. The control points generate signals in response to a stimulus received from an associated station set. The current status of each associated station set is indicated by the active or nonactive state of the physical control points. The state of the control points are replicated in either the line scan map or the trunk scan map, as appropriate. The control processor responds to the trunk or line appearance as determined from the trunk or line scan map, and processes the interconnection accordingly. Each scan map type has an associated call processing algorithm, i.e., line or trunk call processing, for serving a particular connection request from either a line port circuit or trunk port circuit.

Digital interconnections such as between a terminal and a host computer eliminate the need for hard-wired connections to physical control points located on a port circuit board. Digital endpoints communicate by exchanging digital messages. These digital messages are formed in response to a stimulus generated from a terminal or host computer indirectly via a digital line port circuit. The control processor responds to each received message and processes the connection according to the message content. These connections between terminals and host computers are processed according to line call processing algorithms since the originating ports are line port circuits. The following description explains the process of interlinking line and trunk call processing when a host computer interconnection is served so that the interconnection is processed as a trunk rather than a line connection.

HOST COMPUTER INTERCONNECTIONS

Figure 4:
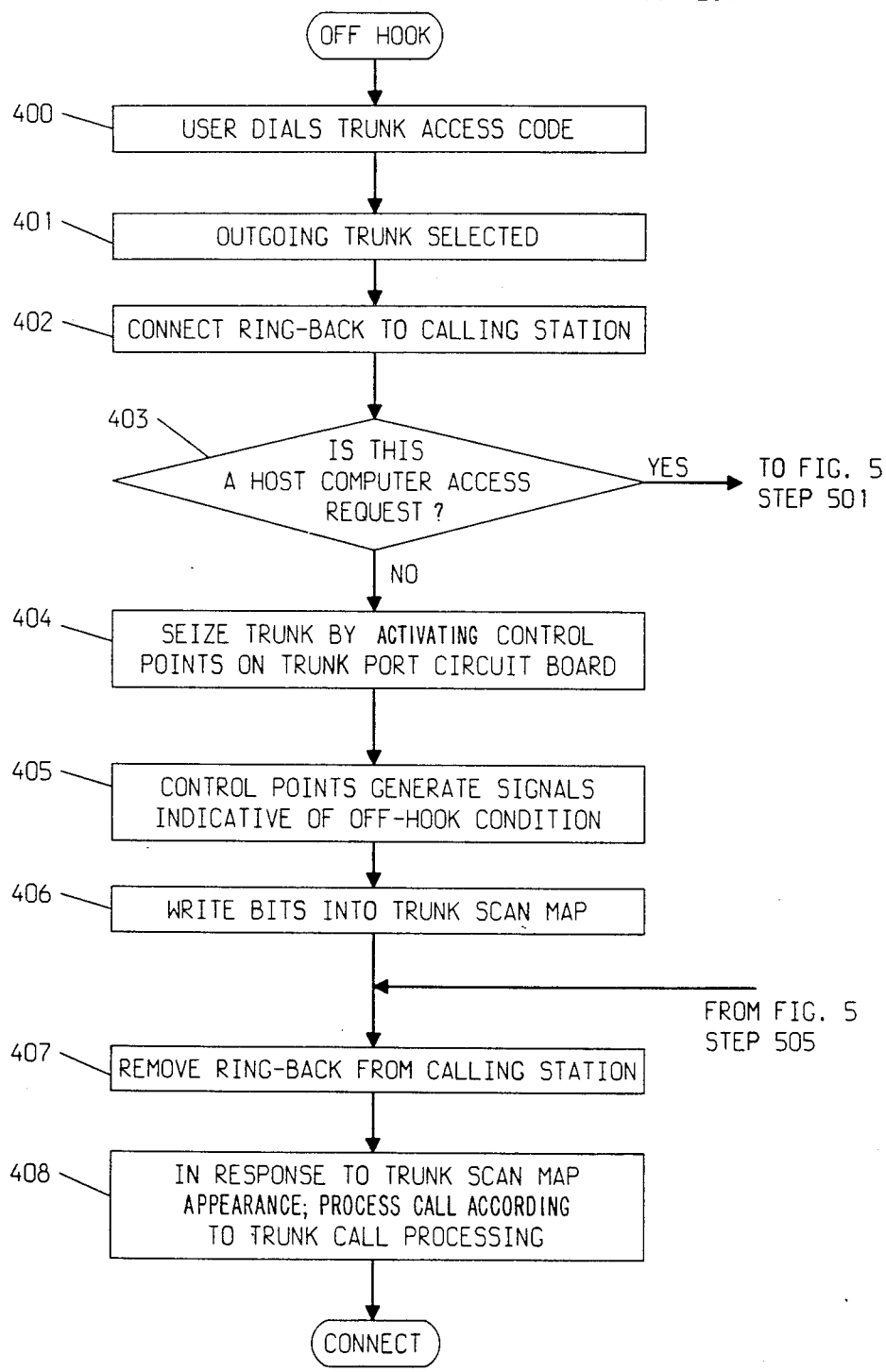
Figure 7:
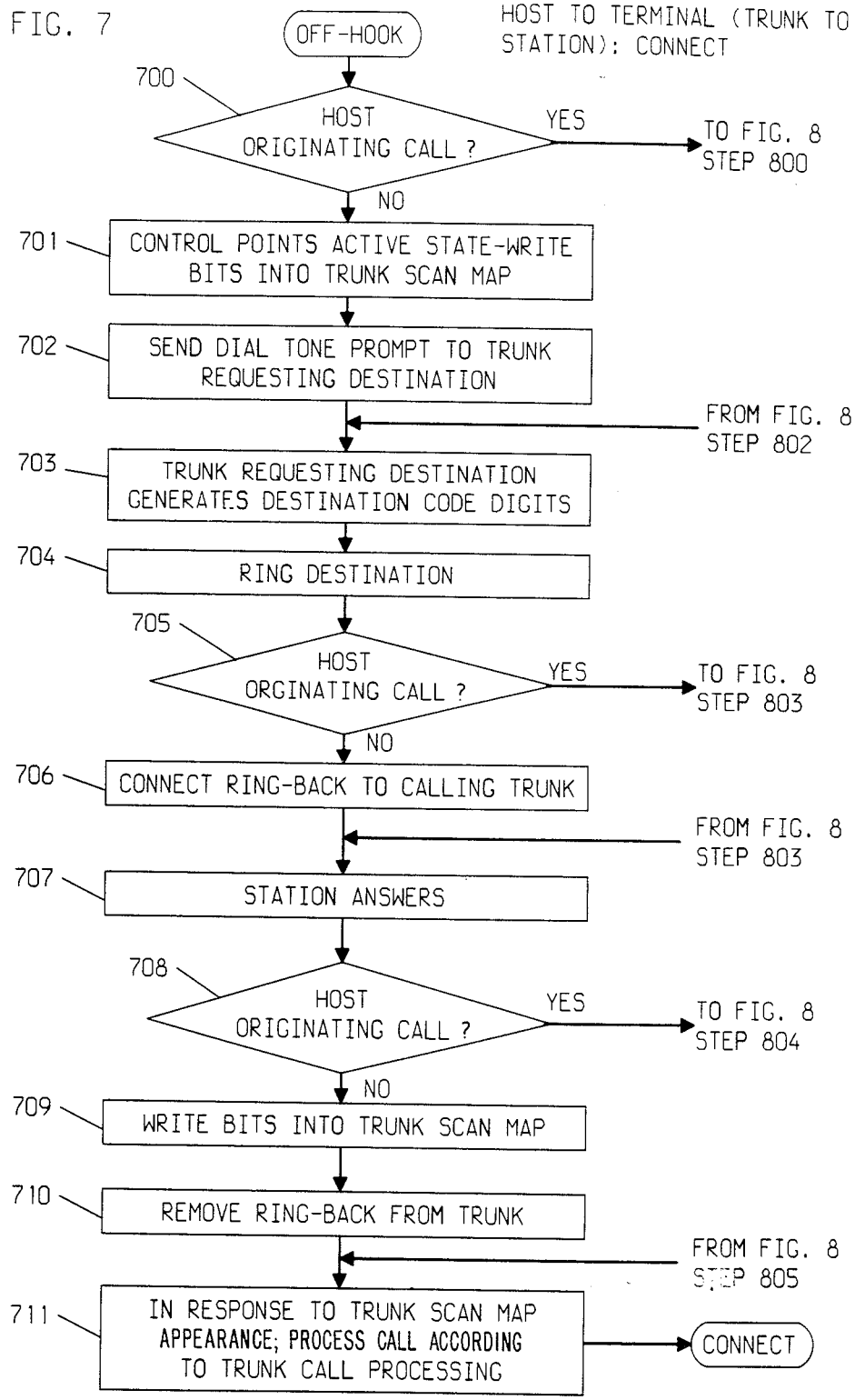
Figure 8:
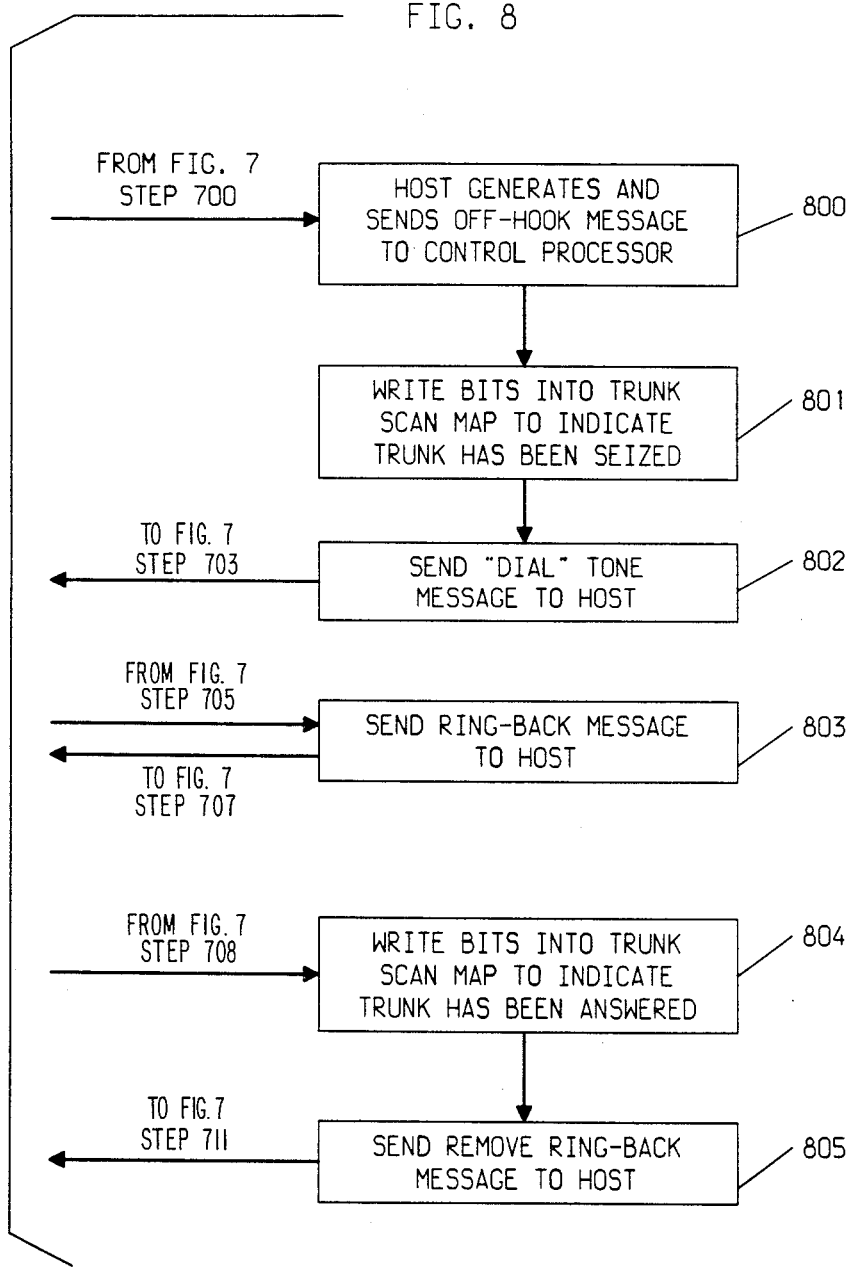

FIGS. 4–9 illustrate flowcharts that identify the steps in call processing that allow interconnections between a host computer and terminal to undergo processing as trunk interconnections. In particular, FIGS. 4–6 illustrate flowcharts that trace a terminal to host computer connection and FIGS. 7–9 illustrate flowcharts that trace a host computer to terminal connection. The flowcharts identify those portions in the normal trunk call processing routine where S channel messages simulate the trunk signalling characteristics of trunk port circuits in order to effect trunk call processing algorithms for establishing or disengaging the interconnection. Normal line call processing and normal trunk call processing algorithms are known and therefore, are not extensively discussed or disclosed on the flow charts. Additionally, the services included in trunk call processing, previously discussed, are not replicated in flowchart form since these are well known call processing features and system management capabilities.

TERMINAL TO HOST COMPUTER INTERCONNECTION

FIGS. 4 and 5 illustrate the steps in the trunk call processing logic necessary to establish an analog interconnection from a station to trunk and a digital interconnection from a terminal to a host computer. The first type of connection described is that of a station to a trunk. Assume that the station user is off-hook and that control processor 112 of FIG. 1 indicates this condition in the line scan map. As previously described, the scan map contains an indication corresponding to the single control point on the line port circuit board. That indication is represented by a binary bit. For example, a 0 indicates an on-hook condition (inactive control point) and a 1 indicates an off-hook condition (active control point). Assume the bit is a 1, and that control processor 112 applied a signal to the originating station such as analog station set 100-0. This signal generates a dial tone which prompts the user to identify a destination. In response to the dial tone, the station user dials a trunk access code as indicated by step 400. Control processor 112 collects the digits dialed and selects an available outgoing analog trunk (step 401). Since this is not a host computer access request, processing proceeds from step 402 to 403. Control processor 112 generates signals over the CTRL path and activates the control points associated with the selected outgoing trunk. This process of activating control points on the port circuit board seizes that trunk for the connection as indicated by step 404. The active control points on the port circuit board generate signals over the CTRL lead via module processor 111 to control processor 112. These active control points, as previously discussed, indicate that the called end is off-hook, i.e. the called party answered. In response to the signals on the CTRL lead, control processor 112 writes into the trunk scan map the off-hook stimulus indication of two bits, i.e. two 1s, as shown by step 405. In response to the appearance of the pair of 1 bits which indicate two physically active control points on a trunk port circuit, control processor 112 processes the connection according to trunk call processing algorithms and the connection results as indicated by step 406. The above discussion identifies the steps in effecting a connection from a station to an analog trunk whereby call processing operates on the connection to process the call according to trunk sequence call processing algorithm.

Now assume that a terminal user (such as terminal 107-0) desires a host computer (such as host computer 104) connection, and further desires automatic implementation of the trunk services previously mentioned. If the user does not desire system management capabilities and call processing features, the user may allow the connection to undergo processing according to normal line call processing algorithms. These algorithms are not described, since these algorithms comprise no part of the present invention.

Assume the terminal user received a prompt in response to an S channel message from control processor 112 to proceed in identifying the destination. In particular, control processor 112 generates the prompt indication following receipt of an off-hook S channel message stimulus received from the terminal 107-0 user via module processor 111. Stimulus indications are contained in S channel messages. Digital line ports generate data messages rather that having physical control points to indicate a current state. Communication between a line port circuit and the control processor does not rely on generated signals from control points, but on the generation of data messages. Control information as contained in data messages is exchanged over the S channels between digital endpoints and the control processor to establish a connection between the digital endpoints.

Assumes the terminal user has identified host computer 104 as the destination end-point. As indicated by step 402, when a host computer request is served, the normal call processing algorithm branches to the auxiliary algorithm. This algorithm is illustrated in flowchart form on FIG. 5. Prior to step 500, control processor 112 generates an S channel message to connect the "ringback" to digital port 109-0. Data module 108-0 responds and sends a "ring" data message to terminal 107-0. This indicates that host computer 104 is being accessed.

Concurrently, control processor 112 generates a "ringer-on" S channel message and applies this messages over path 127 to module processor 111. Module processor 111 applies this message over the S channel to digital port 106-0 which, in turn, transmits the message over path 123-0 to data module 105-0. Data module 105-0 applies an incoming call indication to host computer 104. Following receipt of this indication, the host computer "trunk" is seized (step 501). As indicated by step 502, control processor 112, simultaneously, sets a bit, 1, which indicates that the outgoing trunk is seized into the trunk scan map associated with analog trunk call processing. This bit is analogous to the bit generated in response to a signal received from a single active control point located on a port circuit board. Since digital line ports have no physical control points such as those located on analog trunk or line port circuit boards, the data messages exchanged between the digital port and the control processor emulate those signals that are associated with seizing an analog trunk.

Step 503 indicates that the host computer is available. Host computer 104 generates an S channel message indicating that the host computer is "off-hook". Control processor 112 responds to this off-hook stimulus message generated from associated data module 105-0 of host computer 104, and sets an additional, 1, bit into the analog trunk scan map (step 504). The trunk scan map now contains two, 1, bits. These two bits indicate that an the out-going "trunk" has been seized and that the destination i.e., host computer 104, has answered. The appearance of two bits in the analog trunk scan map is analogous to the two bits generated in response to signals received from the activation of physical control points on an analog trunk port circuit board during the call set-up phase of an interconnection. Control processor 112 generates a "ringer-off" message to host computer 104 as indicated by step 505. The normal trunk call processing routine is now intercepted prior to step 407 and the connection is thereafter processed as a trunk connection.

Control processor 112 does not distinguish the fact that the appearance of the two bits in the analog trunk scan map resulted from S channel message stimulus rather than from physical signal stimulus received from active physical control points located on a trunk port circuit board. Control processor 112 responds to the appearance of the bits in the trunk scan map and implements trunk call processing to establish the connection. Once trunk call processing begins, a variety of trunk services are automatically available for the connection.

In the above-described manner, host computer interconnections are processed as trunk connections using existing trunk call processing algorithms. When calls involving host computers are involved, the line call processing algorithm includes a step that identifies the host computer request. The control processor responds to this request and immediately initiates the auxiliary routine. The auxiliary routine simulates trunk signalling characteristics by utilizing data messages in lieu of actual signals. These data messages force bits into the trunk scan map. The control processor "perceives" these bits as a trunk appearance. In response to the trunk appearance, the control processor processes the call according to existing trunk call processing algorithms. Line call processing interlinks with trunk call processing wherever a host computer request is involved.

FIG. 6 illustrates the flowchart identifying the steps to disconnect a terminal from a host computer. Briefly, the station or terminal user goes on-hook as indicated by step 600. This action generates a stimulus. With respect to a station user, the stimulus is a signal that indicates the non-active state of the control points on the trunk port circuit board. With respect to a terminal user, the stimulus is an S channel data message containing the information that the terminal user went on-hook. If this is not a terminal to host computer connection, control processor 112 deactivates the associated control points and represents this state in the trunk scan map. Control processor 112 responds to the trunk scan map bit appearance and disconnects the endpoints as shown in steps 605 and 606. If this is a terminal to host computer connection, steps 602-604 indicate that control processor 112 and host computer 104 exchange S channel messages to change the bit pattern in the scan map. The bits change from 1's to 0's. This indicates the non-active or on-hook condition of the host computer. Control processor 112 responds to the appearance of the 0 bits representing the non-active condition and processes the disconnect operation according to the normal analog trunk processing algorithm (step 606). Following processing, the terminal to host computer connection is terminated.

S channel messages serve to simulate the deactivation of physical control points such that the appropriate bits appear in the trunk scan map. Control processor 112 processes the connection in response to the scan map stimulus. Again S channel messages substitute for the signals generated from the physical control points responsive to associated station states in order to effect trunk call processing algorithms.

HOST COMPUTER TO TERMINAL

FIGS. 7-8 illustrate the flowcharts indicating the steps necessary to process a call connection between a host computer and a terminal. FIG. 9 illustrates the steps that are required to disconnect a host computer from a terminal. These flowcharts are not discussed in detail, but are merely illustrative of the process of using S channel messages in the place of signals generated from active or non-active physical control points to establish trunk connections when the host computer initiates call set-up or take-down phases of a connection. Control processor 112 processes the connection in response to the stimulus, 1 bits or 0 bits, appearing in the trunk scan map. With respect to station call set-up or take-down phases, the control points on an associated port circuit board generate signals in response to active or inactive states as determined by the on-hook or off-hook condition of an associated station set. With respects to host computer call set-up or take-down phases, S channel messages which simulate the signals generated by the control points located on a trunk port circuit board provide the control processor with on-hook and off-hook data messages indicative of the condition of an associated station. In either case, the trunk scan map reflects a trunk appearance by the insertion of bits into the scan map to indicate the condition of each endpoint on the connection. The control processor responds to the trunk appearance and administers the call according to trunk call processing algorithms for interconnections between the terminal and host computer.

The above description identifies those portions of an existing trunk call processing algorithm which are simulated utilizing S channel messages to affect trunk call processing for interconnections between terminals and host computers. In particular, the S channel messages simulate the signals generated from the active or nonactive control points located on a trunk port circuit board. By simulating the state of the control points, the S channel messages cause the control processor to set the appropriate bits into the trunk scan map. The control processor then responds to the appearance of these bits in the trunk scan map and processes the connection according to trunk call processing routines.

The above-described arrangement precludes the addition of any hardware and does not require extensive software modifications. This arrangement uses existing algorithms with minor modification to provide trunk call processing for interconnections between a terminal and host computer. Trunk call processing provides a variety of services for interconnections between a terminal and host computer.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. In a communication switching system controlled by a control processor serving at least two classes of port circuits having different types of associated communication devices where said control processor includes a plurality of connection processing algorithms and each algorithm is associated with an identifiable class of port circuits, a processing arrangement for providing a requesting port circuit of one class of port circuits with access to any one of said connection processing algorithms associated with a different class of port circuits comprising:

means for identifying said one class of port circuits associated with said requesting port circuit;

means responsive to said identifying means for implementing the execution of a one of said connection processing algorithms associated with said requesting port circuit;

means further responsive to said identifying means for indicating when said requesting port circuit requests access to a specified one of said connection processing algorithms associated with a different class of port circuits;

means responsive to said indicating means for terminating the execution of said one connection processing algorithm associated with said requesting port circuit; and means responsive to said terminating means for implementing the execution of said specified one of said connection processing algorithms associated with said different class of port circuits.

2. In a communication switching system controlled by a control processor serving line port circuits associated with any type of communication device and trunk port circuits associated with any type of communication device where said control processor includes line call processing algorithms associated with line port circuits and trunk call processing algorithms associated with trunk port circuits, a call processing arrangement for providing trunk features associated with trunk call processing to line port circuit connections comprising:

means for implementing the execution of said line call processing algorithms when one of said line port circuits requests a call connection;

means for specifying when said one port circuit requests said call connection include said trunk features associated with trunk call processing;

means responsive to said specifying means for terminating said line call processing algorithms; and means responsive to said terminating means for implementing said trunk call processing to establish said call connection including said trunk features.

3. In a communication switching system controlled by a control processor serving trunk port circuits and line port circuits having associated station equipment wherein said port circuits connect to said control processor by a communication channel, a call process interlinking arrangement in said control processor for providing service features associated with trunk port circuits for connections involving line port circuits comprising:

a first means responsive to a first set of signals generated over said communication channel from any one of said line port circuits to said control processor for establishing a call connection between said one line port circuit and a second one of said line port circuits;

a second means responsive to a second set of signals generated over said communication channel from any one of said trunk port circuits to said control processor for establishing a call connection between said one trunk port circuit and at least one other port circuit; and bridging means responsive to a combination of said first set of signals from said one line port circuit and said second set of signals also from said one line port circuit for interconnecting said first means to said second means to provide service features associated with trunk port circuits when said call connection is between line port circuits.

4. In a communication switching system controlled by a control processor serving trunk port circuits and line port circuits having associated station equipment wherein said port circuits connect to said control processor by a communication channel, a call process interlinking arrangement in said control processor for establishing trunk call connections between a line port circuit associated with a terminal and a line port circuit associated with a host computer to provide trunk service features for said terminal and host computer interconnection comprising:

trunk call processing means in said control processor for establishing trunk call connections between at least one trunk port circuit and one other port circuit;

line call processing means in said control processor for establishing line call connections between at least two line port circuits;

bridging means for interconnecting said line call processing means and said trunk call processing means to establish trunk call connections between at least two line port circuits when at least one of said line port circuits serves said host computer;

wherein said bridging means includes:

means for generating digital information from said line port circuit associated with said host computer on an existing call connection indicative of a request for said trunk service features;

means responsive to said generating means for simulating informational conditions associated with trunk port circuits during an initiation of a trunk connection; and means for transmitting said simulated informational conditions to said trunk call processing means to obtain said trunk service features.

5. In a communication switching system controlled by a control processor serving line port circuits and trunk port circuits where said control processor includes line call processing algorithms associated with line port circuits and trunk call processing algorithms associated with trunk port circuits, a method of providing trunk features associated with trunk call processing to line port circuit interconnections, said method comprising the steps of:

identifying when one of said line port circuits requests said trunk features associated with trunk call processing;

simulating signalling characteristics associated with said trunk port circuits during the initiation of trunk call processing; and branching from line call processing to trunk call processing in response to said simulated signalling characteristics to provide trunk call processing for line port circuit interconnections.

6. A method for initiating trunk call processing when establishing a call connection between line port circuits in a communication switching system controlled by a control processor serving line port circuits and trunk port circuits having different types of associated communication devices where said control processor includes line call processing algorithms associated with line port circuits and trunk call processing algorithms associated with trunk port circuits, said method comprising the steps of:

indicating when one of said line port circuits requests trunk call processing;

simulating signalling characteristics associated with said trunk port circuits during initiation of a trunk connection; and implementing said trunk call processing in response to simulated signalling characteristics of said trunk connection to establish a trunk call connection including said line port circuit.

7. A method of establishing trunk connections via a communication channel between at least two line port circuits serving different types of communication devices in a communication switching system controlled by a control processor serving trunk port circuits by activating trunk connection processing having a plurality of service features and line ports circuits by activating line connection processing, said method comprising the steps of:

initiating line connection processing in response to signals generated to said control processor over said communication channel from at least one of said line port circuits;

identifying a request for a trunk connection;

simulating signalling characteristics associated with trunk port circuits during an initiation of a trunk connection; and processing in response to said simulation said line port circuit connection as a trunk connection by implementing trunk connection processing.

8. A method of providing trunk services for line port circuit interconnections involving a host computer and at least one terminal in a switching system controlled by a control processor where said control processor serves trunk port circuits by activating trunk connection processing and line port circuits by activating line connection processing to establish connections, said method comprising the steps of:

generating signalling information from a line port circuit to initiate line connection processing;

detecting from said signalling information when said host computer is involved in said line connection processing;

branching from said line connection processing to auxiliary processing when said host computer is involved;

simulating trunk signalling information in said auxiliary processing;

implementing trunk connection processing in response to said trunk signalling information from said auxiliary processing; and processing said host computer and terminal interconnection to establish a trunk connection having availability of said trunk services.

* * * * *